United States Patent [19]
Yokoya

[11] Patent Number: 4,821,852
[45] Date of Patent: Apr. 18, 1989

[54] SHOCK ABSORBER

[75] Inventor: Yuji Yokoya, Toyota, Japan

[73] Assignee: Toyota Jidosha Kabushiki Kaisha, Aichi, Japan

[21] Appl. No.: 56,760

[22] Filed: Jun. 2, 1987

[30] Foreign Application Priority Data

Jul. 25, 1986 [JP] Japan .................................. 61-175232

[51] Int. Cl.⁴ ............................................... F16F 9/52
[52] U.S. Cl. ............................... 188/322.15; 188/317; 188/322.22; 188/282; 137/854
[58] Field of Search .................... 188/316, 317, 322.15, 188/322.14, 282, 322.22, 311, 313, 322.13; 137/516.27, 854, 856, 857

[56] References Cited

U.S. PATENT DOCUMENTS

| | | | |
|---|---|---|---|
| 3,036,592 | 5/1962 | Lips | 137/854 |
| 4,111,231 | 9/1978 | Leppich | 137/854 |
| 4,460,074 | 7/1984 | Muller et al. | 188/322.15 |

FOREIGN PATENT DOCUMENTS

| | | |
|---|---|---|
| 407955 | 1/1925 | Fed. Rep. of Germany . |
| 907858 | 3/1954 | Fed. Rep. of Germany . |
| 2002078 | 7/1971 | Fed. Rep. of Germany . |
| 2005430 | 8/1971 | Fed. Rep. of Germany . |
| 2932245 | 2/1981 | Fed. Rep. of Germany . |
| 1133490 | 3/1957 | France . |
| 863595 | 3/1961 | United Kingdom . |

Primary Examiner—Andres Kashnikow
Assistant Examiner—Mark T. Le
Attorney, Agent, or Firm—Parkhurst, Oliff & Berridge

[57] ABSTRACT

A shock absorber includes a piston for partitioning the interior of a cylinder into two liquid chambers while affording communication between both liquid chambers through a plurality of ports, and a valve body biased toward the piston for opening and closing the ports. The piston has a ring portion which forms a path in cooperation with the valve body for regulating the amount of liquid flowing from the ports around an outer peripheral edge of the valve body. An effective area of the ports is larger than the maximum effective area of the path.

6 Claims, 4 Drawing Sheets

SHOCK ABSORBER

BACKGROUND OF THE INVENTION

1. Field of the Invention

This invention relates to shock absorbers, and more particularly to shock absorbers comprising a partition member for partitioning the interior of a cylinder into two liquid chambers while affording communication between both liquid chambers through at least one port, and a valve body biased toward said partition member for opening and closing said port.

2. Description of the Prior Art

A known partition member for partitioning the interior of the cylinder into two liquid chambers while affording communication between both liquid chambers through at least one port, for example, a piston disposed in a cylinder of a hydraulic buffer, or a valve case of a base valve disposed on the bottom of an inner cylinder in the case of a twin tube type hydraulic buffer, is configured so as to control flow of liquid in cooperation with a valve body biased toward the partition member by a spring. In particular, a known shock absorber incorporated in a suspension of an automobile has a partition member which is provided with one or a plurality of orifices in addition to the port (for example, Japanese Utility Model Public disclosure (KOKAI) No. 64536/86).

In such a shock absorber provided with an orifice, damping force is generated according to piston speed as shown in FIG. 5. That is, when the piston speed is between O and $V_1$, liquid flows through the orifice and the damping force generated at this time by the viscous resistance of liquid increases in the form of a second-order, non linear curve as the piston speed increases. When the piston speed reaches $V_1$ and the damping force becomes $F_1$, the damping force is equal to the spring force acting on the valve body. When the piston speed is between $V_1$ and $V_2$, liquid flows, urging the valve body away from the partition member against the spring force, and the damping force increases approximately linearly. When the piston speed reaches $V_2$ and the damping force becomes $F_2$, the viscous resistance of liquid passing through the port is equal to the spring force. When the piston speed exceeds $V_2$, the damping force generated by the viscous resistance of liquid flowing through the port increases in the form of a second-order, non linear curve as the piston speed increases.

The damping force of such a shock absorber is designed to have the so-called two stepped characteristics shown in FIG. 5 for the following reasons. In the region of low piston speed, up to $V_1$, the damping force, which is relatively large and can rise rapidly according to a vehicle speed, is needed in order to restrain rolling and nose dive at the time of braking and vibration of sprung. In the region of the piston speed between $V_1$ and $V_2$, however, the increase in damping force as the piston speed increases is preferably restrained in order not to degrade ride comfort. When the piston speed exceeds $V_2$ (usually the piston speed increases when travelling on a bad road), high damping force is needed in order to restrain vibration of unsprung.

When the piston speed is between O and $V_1$ and exceeds $V_2$, the damping force of the shock absorber is generated by utilizing the viscous resistance of the liquid. Consequently, the effect of the liquid temperature is very noticeable. That is, as shown in FIG. 5, the damping force characteristics change greatly at a low temperature $T_1$ and at a high temperature $T_2$ relative to the design characteristics at a temperature $T_0$, as indicated by the three curves $T_0$, $T_1$ and $T_2$. This causes the damping force to vary according to season and, in addition, immediately after use at low liquid temperature, and after a considerable period of time has elapsed and the liquid temperature has become sufficiently high, thereby greatly varying the ride characteristics of a vehicle.

To cope with the above-mentioned problems, it has been proposed, for example, as described in Japanese Utility Model Public Disclosure (KOKAI) No. 56940/80, that a bimetal member be disposed between the spring for biasing the valve body toward the piston and a member for supporting the spring to vary the spring force according to liquid temperature, thereby compensating for the change in viscosity. However such an arrangement is complicated in construction and high in cost.

As a consequence of the large variation in the damping force due to liquid temperature difference in a high speed region, the damping force in the high speed region is extremely large when the vehicle travels on a bad road at low liquid temperatures. Therefore ride comfort is degraded. Further, the strength of the mounting section of the shock absorber on the car body will be greatly damaged by the excessive damping force. Also, at high liquid temperatures or when travelling on the bad road for a long time, the damping force in the high speed region becomes too small, which causes the wheel stroke to become too large and the bound and rebound stoppers to be frequently hit. As a result, not only ride comfort is degraded, but also the strength of the mounting section on the car body is greatly damaged.

SUMMARY OF THE INVENTION

An object of the present invention is to provide a shock absorber capable of restraining the variation in damping force due to temperature change, particularly in a high speed region.

A shock absorber according to the present invention comprises a partition member for partitioning the interior of a cylinder into two liquid chambers while affording communication between both liquid chambers through at least one port, and a valve body biased toward the partition member for opening and closing said port, the partition member forming a path in cooperation with said valve body for restraining the amount of liquid flowing out of the port around a peripheral edge of the valve body, and an effective area of the port being larger than the maximum effective area of the path.

In a preferred embodiment, the partition member has a ring portion and the path is formed by the ring portion and the valve body.

Since the maximum effective area of the path formed by the valve body and the ring portion is not larger than that of the port, the liquid amount is always determined by the area of the path and the generated damping force is not affected by the port.

When the piston speed reaches the high speed region at a low liquid temperature, the damping force generated before the valve body has substantially opened, i.e., while the area of the path is large, will depend upon the viscosity of the liquid rather than the elasticity of a spring. While the viscosity of liquid is large at this time, the damping force will have approximately the design characteristics since the area of the path is also large.

When the liquid temperature is high, the viscosity of the liquid becomes small. In this case, unless the area of the path becomes small, the damping force depending on the elasticity of the spring will not balance with that depending on the viscosity of liquid. Thus, when both of them balance with each other, the viscosity of liquid is small while the area of the path is also small. Therefore, the damping force will have approximately the design characteristics.

Thus, in particular, the variation of the damping force due to change in liquid temperature in the high piston speed region can be automatically adjusted.

Since the partition member is provided only with the ring portion, the construction is simplified and the cost can be minimized.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
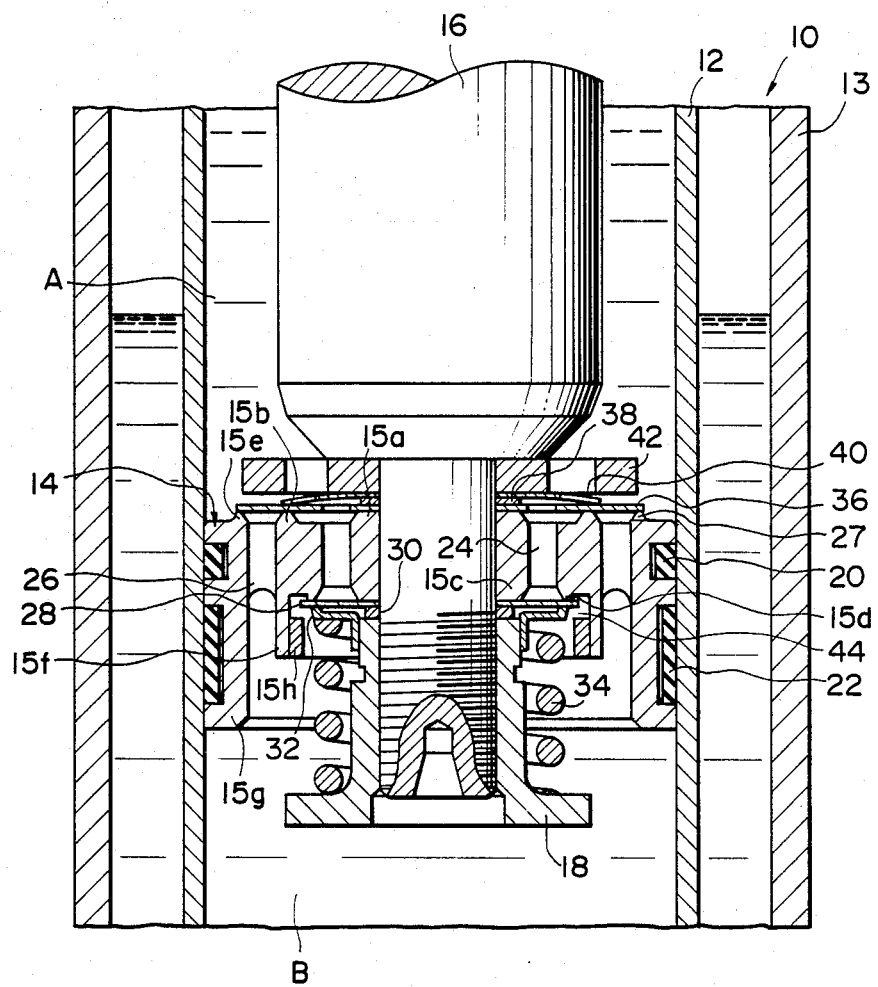
FIG. 1 is a sectional elevation view showing principal parts of a shock absorber.

As shown in FIG. 1, a shock absorber 10 comprises a partition member 14 for partitioning the interior of a cylinder 12 into two liquid chambers. The shock absorber 10 is a so-called twin tube type provided with the inside cylinder 12 and an outside cylinder 13 spaced from the cylinder 12.

In the embodiment shown, the partition member 14 is a piston. An end of a piston rod 16 extends through the piston 14 and is screwed into a nut 18 serving as a spring carrier, so that the piston 14 is connected to the piston rod 16. On an outer periphery of the piston 14 are attached piston rings 20,22. The interior of the cylinder 12 is partitioned into two liquid chambers A,B in a liquid-tight state. The piston 14 has a plurality of ports 24, through which liquid flows during an extension of the piston rod 16, and a plurality of ports 26, through which liquid flows during a contraction of the piston rod 16, both ports being spaced from each other circumferentially (two ports are respectively shown in the drawing). Both liquid chambers A,B communicate with each other through these ports.

Upper openings of the ports 24 are surrounded by an inside land 15a and an intermediate land 15b while lower openings of the ports 24 are surrounded by an inside land 15c and an intermediate land 15d. On the other hand, upper openings of the ports 26 are surrounded by the intermediate land 15b and an outside land 15e while lower openings of the ports 26 are surrounded by inner and outer peripheral walls 15f,15g, respectively, extending cylindrically in an axial direction of the cylinder 12. These lands preferably improve an adhesive property of a valve body which will be described later. The outside land 15e is provided with at least an orifice 27 which communicates to the liquid chamber A in one side and to the ports 26 on the other side.

A valve body 28 for opening and closing the ports 24 is disposed on an underside of the port 24. The valve body 28 is made of a plate spring. An inner peripheral portion of the valve body 28 is sandwiched with a spacer 30 between the nut 18 and the piston 14, and an outer peripheral portion of the valve body receives the spring force of a coil spring 34 through a spring seat 32. Thus, the valve body 28 is biased toward the piston 14 by the spring force of the valve body itself and the spring force of the coil spring 34.

A valve body 36 for opening and closing the ports 26 is disposed on an upperside of the port 26. The valve body 36 is made of a plate spring. An inner peripheral portion of the valve body 36 is sandwiched with a spacer 38, an inner peripheral portion of a coned disk spring 40 and an inner peripheral portion of a stopper 42 between the piston 14 and a shoulder of the piston rod 16. An outer peripheral portion of the valve body 36 receives the spring force of the coned disk spring 40. Thus, the valve body 36 is biased toward the piston 14 by the spring force of the valve body itself and the spring force of the coned disk spring 40.

Figure 2:
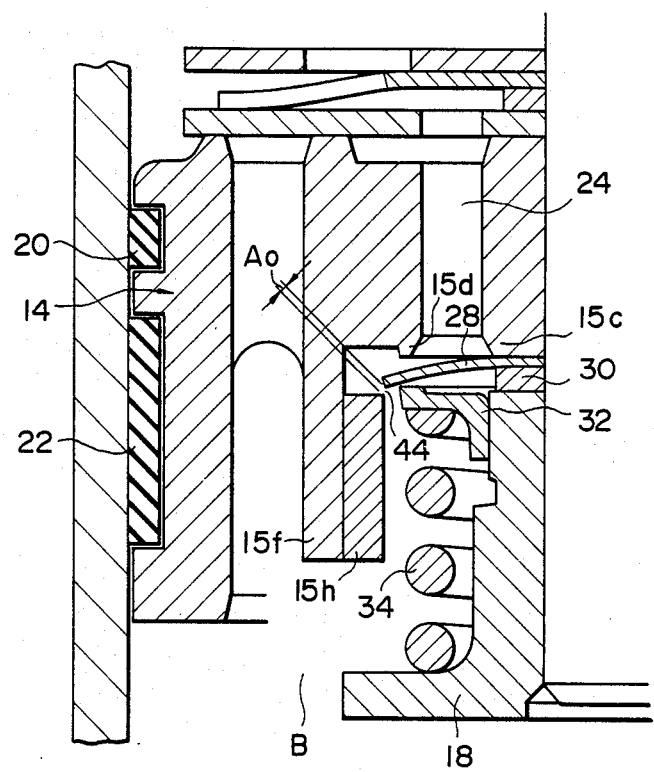
FIG. 2 is an enlarged sectional view showing a path formed by a valve body and a ring portion.

The piston 14 has a ring portion 15h. In the embodiment shown in FIGS. 1 and 2, the ring portion 15h is formed as a ring-like separate member independent of the piston 14 and press fitted into the inner peripheral wall 15f. The ring portion 15h in cooperation with the valve body 28 forms a path 44 for regulating the amount of fluid flowing from the ports 24 to the liquid chamber B around an outer peripheral edge of the valve body 28. The maximum effective area of the path 44, i.e., when the valve body 28 closely contacts the lands 15c,15d, is smaller than the total effective area of the plurality of ports 24. Thus, the viscous resistance of liquid flowing through the ports 24 becomes smaller than that of liquid flowing through the path 44, and the damping force is affected exclusively by the effective area of the path 44.

Figure 3:
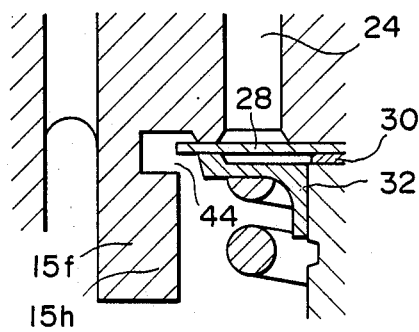
FIG. 3 is a sectional view showing a path formed by the valve body of FIG. 2 and another ring portion.

In the embodiment shown in FIG. 3, a ring portion 15h is provided integrally with and extends inwardly from the inner peripheral wall 15f of the piston. A path 44 formed by the valve body 28 in cooperation with the ring portion 15h is identical with that described before. When an outer diameter of the valve body 28 is larger than a bore of the ring portion 15h, the valve body 28 is deflexed to be mounted with a slight press fit.

In the foregoing embodiments, the partition member is the piston in a twin tube type shock absorber. The partition member, however, may be a piston in a mono tube type shock absorber. Further, the partition member may be a valve case of a base valve provided on the bottom of the inside cylinder 12 in the twin tube type shock absorber shown in FIG. 1.

In the embodiments shown in FIGS. 1 and 3, when the piston rod 16 extends, the valve body 28 flexes and the path 44 regulates the liquid flow. Instead, a path functioning when the piston rod 16 contracts may be formed by the valve body 36 in cooperation with the piston 14.

OPERATION OF THE EMBODIMENTS

The shock absorber 10 is used by enclosing oil and other liquid in the cylinder 12.

Figure 4:
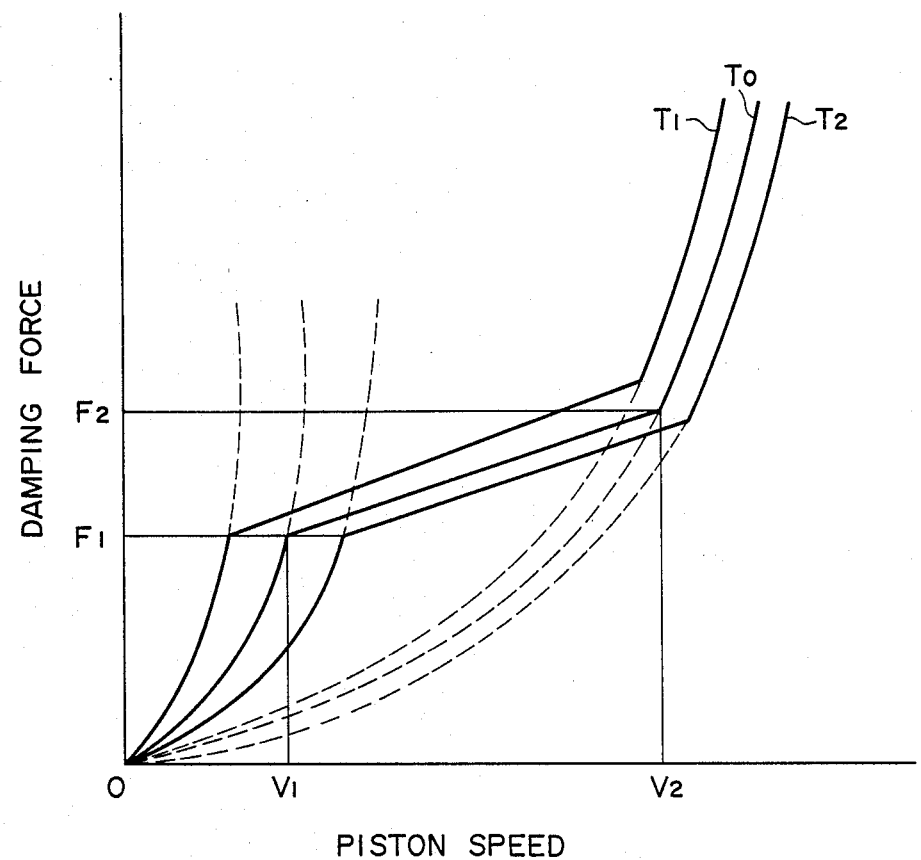
FIGS. 4 and 5 are graphs showing the damping force characteristics according to piston speed and temperature for, respectively, the shock absorber according to the present invention and a prior art shock absorber.
Figure 5:
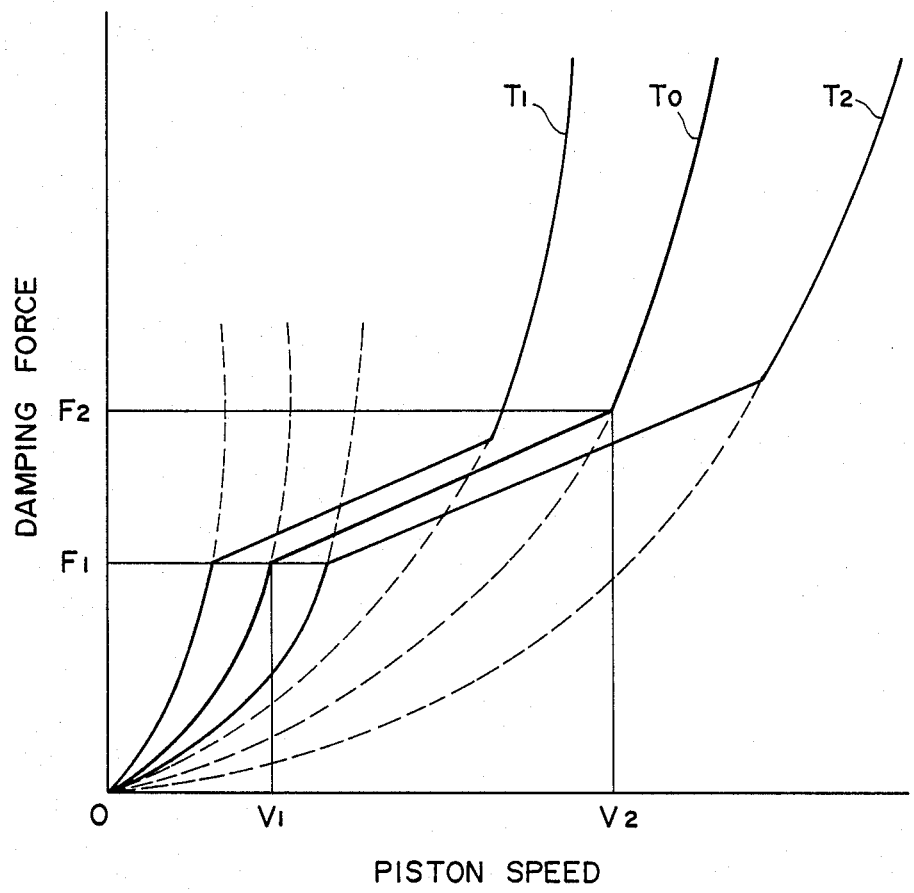

When the liquid temperature is below the reference condition ($T_0$) and the piston rod 16 extends, as shown in FIG. 4, the liquid in the liquid chamber A flows from the orifice 27 through the ports 26 to the liquid chamber B until the speed of the piston 14 reaches $V_1$. During this time, the damping force is generated by the viscous resistance of the liquid. When the piston speed reaches $V_1$, the valve body 28 is flexed downwardly by the liquid flowing through the ports 24. At this time, the damping force will depend on the spring force. After the piston speed exceeds $V_2$, the damping force depends on the viscosity of the liquid flowing through the path 44.

When the liquid temperature is low ($T_1$), the damping force will depend on the viscous resistance of the liquid flowing through the path 44 before the valve body 28 has greatly opened, i.e., while the effective area $A_0$ of the path 44 is large. As a result, the characteristics of the damping force approximate the characteristics $T_0$ exhibited at the reference condition.

On the other hand, when the liquid temperature is high ($T_2$), the viscosity of the liquid is small, so that the damping force will depend on the viscous resistance of the liquid flowing through the path 44 after the effective area $A_0$ of the path 44 becomes small. Therefore, the characteristics of the damping force still approximate the characteristics $T_0$ exhibited at the reference condition.

What is claimed is:

1. A shock absorber comprising:
    partition means for partitioning the interior of a cylinder into two liquid chambers while affording communication between both liquid chambers through at least one port, the partition means having ring means; and
    a valve body biased toward said partition means for opening and closing said at least one port, wherein said partition means forms a first path in cooperation with said valve body for regulating the amount of liquid flowing from said at least one port around a peripheral edge of said valve body and has a second path extending from said first path defined by a bore of said ring means, and wherein the effective areas of said at least one port and said second path are respectively larger than the maximum effective area of said first path.

2. A shock absorber as claimed in claim 1, wherein said first path is formed so as to have the maximum effective area when said valve body contacts said partition means and so as to reduce the effective area gradually as said valve body approaches said ring means.

3. A shock absorber as claimed in claim 1, wherein said ring means is formed as a part independent of said partition means and is secured fixedly thereto.

4. A shock absorber as claimed in claim 1, wherein said ring means is formed integrally with said partition means.

5. A shock absorber comprising:
    partition means for partitioning the interior of a cylinder into two liquid chambers while affording communication between both liquid chambers through at least one port; and
    a valve body biased toward said partition means for opening and closing said at least one port, wherein said partition means has ring means for forming a first path in cooperation with said valve body for regulating the amount of liquid flowing from said at least one port around an outer peripheral edge of said valve body, the bore of said ring means defining a second path extending from said first path, and wherein the effective areas of said at least one port and second path are larger than the maximum effective area of said first path.

6. A shock absorber comprising:
    partition means for partitioning the interior of a cylinder into two liquid chambers while affording communication between both liquid chambers through at least one port; and
    a valve body made of a plate spring for opening and closing said at least one port, said valve body being biased toward said partition means by spring force of the valve body itself and spring force of a coil spring, wherein said partition means has ring means for forming a first path in cooperation with said valve body for regulating the amount of liquid flowing from said at least one port around an outer peripheral edge of said valve body, the bore of said ring means defining a second path extending from said first path, and wherein the effective areas of said at least one port and said second path are respectively larger than the maximum effective area of said first path.

* * * * *